(12) United States Patent
Bernu et al.

(10) Patent No.: US 8,808,442 B2
(45) Date of Patent: Aug. 19, 2014

(54) SOIL STABILIZATION COMPOSITIONS

(75) Inventors: Cory J. Bernu, Farmington, MN (US); Jeremy L. Bachman, Savage, MN (US); Paul F. Werler, Minneapolis, MN (US)

(73) Assignee: Chemstar Products Company, Minneapolis, MN (US)

( * ) Notice: Subject to any disclaimer, the term of this patent is extended or adjusted under 35 U.S.C. 154(b) by 331 days.

(21) Appl. No.: 12/942,804

(22) Filed: Nov. 9, 2010

(65) Prior Publication Data

US 2011/0113983 A1 May 19, 2011

Related U.S. Application Data

(60) Provisional application No. 61/261,577, filed on Nov. 16, 2009.

(51) Int. Cl.
*C09K 17/52* (2006.01)
*C09K 105/00* (2006.01)

(52) U.S. Cl.
CPC .............. *C09K 17/52* (2013.01); *C09K 2105/00* (2013.01); *Y10S 106/90* (2013.01)
USPC ................... 106/162.5; 106/124.4; 106/137.6; 106/137.7; 106/144.1; 106/144.6; 106/144.7; 106/205.9; 106/162.8; 106/164.01; 106/164.3; 106/164.4; 106/164.5; 106/205.6; 106/205.7; 106/205.71; 106/900; 524/28

(58) Field of Classification Search
USPC ................. 106/162.51, 205.71, 205.9, 124.4, 106/137.6, 137.7, 144.1, 144.6, 144.7, 106/162.5, 162.8, 164.3, 164.4, 164.5, 106/164.01, 205.6, 205.7, 900; 524/28
See application file for complete search history.

(56) References Cited

U.S. PATENT DOCUMENTS

| | | | | |
|---|---|---|---|---|
| 4,496,718 | A * | 1/1985 | Rudy ............................... | 536/56 |
| 5,618,341 | A * | 4/1997 | Andersen et al. ......... | 106/287.35 |
| 5,679,145 | A * | 10/1997 | Andersen et al. .......... | 106/162.5 |
| 5,683,772 | A * | 11/1997 | Andersen et al. ............ | 428/36.4 |
| 5,709,827 | A * | 1/1998 | Andersen et al. ............... | 264/42 |
| 6,379,446 | B1 * | 4/2002 | Andersen et al. .......... | 106/162.5 |
| 2002/0108532 | A1 * | 8/2002 | Kesselring et al. ....... | 106/162.51 |
| 2006/0255507 | A1 * | 11/2006 | Bowden et al. ................ | 264/319 |

OTHER PUBLICATIONS

Nishinari et al, ed. Food Hydrocolloids: Structures, Properties, and Functions, pp. 265-267, (Nov. 1992).*
"Canadian Application Serial No. 2,720,536, Response filed Jun. 19, 2013 to Office Action mailed Mar. 28, 2013", 27 pgs.
"Canadian Application Serial No. 2,720,536, Office Action mailed Sep. 24, 2013", 3 pgs.
"Canadian Application Serial No. 2,720,536, Office Action mailed Mar. 28, 2013", 4 pgs.

* cited by examiner

*Primary Examiner* — David M Brunsman
(74) *Attorney, Agent, or Firm* — Schwegman, Lundberg & Woessner, P.A.

(57) ABSTRACT

Hydraulically applied fiber matrix compositions for use on soils include a water-soluble, crosslinkable, hydratable gum, and a compound capable of crosslinking the water-soluble, crosslinkable, hydratable gum. The compositions may further include hydrocolloids and mulch. The hydraulically applied fiber matrix compositions are useful for hydroseeding and soil stabilization.

22 Claims, No Drawings

SOIL STABILIZATION COMPOSITIONS

CROSS-REFERENCE TO RELATED APPLICATIONS

This application claims the priority of U.S. Ser. No. 61/261,577, filed Nov. 16, 2009, which is incorporated herein by reference in its entirety.

FIELD OF THE INVENTION

This invention relates to hydraulically applied fiber matrix compositions for providing ground cover and particularly to preparing a three dimensional system for hydroseeding, erosion control, soil stabilization, and/or soil cover.

BACKGROUND

For large-scale revegetation work such as occurs during highway construction, large residential or commercial building construction, or mine or landfill reclamation, application of hydraulically applied fiber matrix compositions is an efficient aid to control soil erosion and aid in revegetation. In general, existing hydraulically applied fiber matrix compositions are typically placed or left on or near a soil surface to protect the soil and seed from water and wind erosion, reduce evaporation from the soil surface, increase the humidity of the soil, moderate temperature fluctuations at the soil surface, dissipate the energy of falling water droplets to decrease disturbance of the soil surface, and otherwise aid in the establishment of vegetation. Once applied to the soil surface, the hydraulically applied fiber matrix composition forms a 3-dimensional mat to aid in erosion control and the revegetation process. Hydraulically applied fiber matrix compositions are also useful in providing a cover layer to protect refuse at a waste disposal site, or a sanitary or hazardous waste landfill.

Various materials have been used as mulches. Such materials have included straw, composted matter, manure, shredded bark and wood, fabric, and plastic film. Straw and hay are somewhat effective, but contaminate the seed bed with weed seeds. Among the common mulch materials, plastic film is used with many cash crops, e.g. vegetables and ornamentals, due to its low cost and effectiveness in weed control and elevating soil temperature. Among the disadvantages of plastic film are poor distribution of irrigated water and the need to strip the film from fields after the growing season, as plastic film is not biodegradable. Additionally, plastic film does not improve soil as organic mulch materials can do when incorporated into the soil. Pelletized mulches are weed-free, and can be applied with standard rotary or drop spreaders. However, such mulches are dense. Because of their density, it would be necessary to apply these mulches at an extremely high rate in pounds per area in order to cover a substantial amount of the seed bed area. Consequently, mulch pellets are applied to cover only a portion of the seed bed. As a result, they are not as effective as other mulches in protecting the underlying seed bed. Other compositions form a crusted or continuous film that blocks seed germination, or are too expensive in their preparation and application to be commercially feasible. Still other hydraulically applied fiber matrix compositions are not biodegradable and need to be physically removed.

SUMMARY

The present invention provides for a composition that includes: (a) a water-soluble, crosslinkable, hydratable gum; and (b) a gel-forming ion capable of crosslinking the water-soluble, crosslinkable, hydratable gum.

The present invention also provides for a composition that includes: (a) a crosslinked gum comprising an alginate; (b) a hydrocolloid comprising gelatinized starch or starch derivative, guar, or *plantago*; and (c) a mulch comprising wood fiber, shredded paper, of a combination thereof.

The present invention also provides for a composition that includes: (a) a hydrocolloid comprising gelatinized starch or starch derivative; (b) a water-soluble crosslinkable hydratable gum comprising sodium alginate; (c) a mulch comprising wood fiber, shredded paper, of a combination thereof; and (d) a compound capable of crosslinking the water-soluble, crosslinkable, hydratable gum.

The present invention also provides for a composition that includes: (a) about 0-30 wt % of a hydrocolloid comprising gelatinized starch or starch derivative; (b) about 2-30 wt % water-soluble crosslinkable hydratable gum comprising sodium alginate; (c) about 70-99 wt % of a mulch comprising wood fiber, shredded paper, of a combination thereof; and (d) about 0.01-20 wt % of a compound capable of crosslinking the water-soluble, crosslinkable, hydratable gum.

The present invention also provides for a method of erosion control. The method includes contacting a natural ground surface with a composition described herein.

The present invention also provides for a method of erosion control. The method includes contacting a natural ground surface with a composition that includes a water-soluble, crosslinkable, hydratable gum, and a gel-forming ion capable of crosslinking the water-soluble, crosslinkable, hydratable gum.

DETAILED DESCRIPTION

Hydraulically applied fiber matrix compositions include a water-soluble tackifier including a crosslinkable, hydratable gum, and a gel-forming ion capable of crosslinking the water-soluble, crosslinkable, hydratable gum. In specific embodiments, the tackifier composition further includes a hydrocolloid. In still further embodiments, the tackifier composition and a mulch are blended together to form a 3-dimensional erosion control system. In additional embodiments, the applied fiber matrix composition includes a water-soluble hydratable gum and a mulch. Other materials such as, for example, seed, fertilizer, soil conditioner, surfactant, herbicide, pesticide, sequestering agent, natural fiber, synthetic fiber, and dye may be added. The hydraulically applied fiber matrix composition can be packaged or baled for use in a hydrospraying apparatus for hydroseeding, soil stabilization, or landfill cover. A specific embodiment provides hydraulically applied fiber matrix compositions that are virtually 100% biodegradable, environmentally friendly, do not contaminate the soil, and/or are easy to apply.

The hydraulically applied fiber matrix compositions described herein are useful for one or more of the following:
  (a) reducing soil erosion,
  (b) germinating seeds in soil,
  (c) covering soil,
  (d) providing a lawn patch,
  (e) providing a landfill covering,
  (f) providing a soil builder,
  (g) providing a seed bed,
  (h) delivering nutrients to the natural ground surface,
  (i) stabilizing soil,
  (j) killing weeds in the natural ground surface,
  (k) killing insects on the natural ground surface,
  (l) revegetating the natural ground surface, (m) providing for a landscaping cloth,
(n) preventing lawn disease,
(o) stabilizing sand and/or
(p) treating lawn diseases.

The Tackifier

In its simplest form, the tackifier includes a water-soluble, crosslinkable, hydratable gum, and a gel-forming ion capable of crosslinking the water-soluble crosslinkable gum. Typical water-soluble crosslinkable gums are alginates, gellan, and carrageenan. Examples of water-soluble alginates include sodium alginate, potassium alginate, magnesium alginate, ammonium alginate, and propylene glycol alginate. Specifically, the water-soluble, crosslinkable, hydratable gum includes sodium alginate in about 5-60 wt % of the tackifier composition, more specifically in about 15-35 wt % of the tackifier composition, and still more specifically in about 20-30 wt % of the tackifier composition.

Typical gel-forming cations capable of crosslinking the water-soluble crosslinkable gum include but are not limited to alkaline earth metals, transition metals, and polyammonium ions. Exemplary cations include magnesium ($Mg^{2+}$), calcium ($Ca^{2+}$), strontium ($Sr^{2+}$), barium ($Ba^{2+}$), aluminum ($Al^{3+}$), boron ($B^{3+}$), lead ($Pb^{4+}$ or $Pb^{2+}$), copper ($Cu^+$ or $Cu^{2+}$,), cadmium ($Cd^{2+}$), zinc ($Zn^{2+}$), nickel ($Ni^{2+}$), manganese ($Mn^{4+}$ or $Mn^{2+}$,), iron ($Fe^{2+}$ or $Fe^{3+}$), dichromate ($Cr_2O_7^{2-}$), $^+H_3N(-CH_2)_n-CH((CH_2-)_m-NH_3^+)((CH_2)_p-NH_3^+)$ and $^+H_3N(-CH_2)_n-NH_3^+$ or where n is an integer ranging from 1 to 8, and m and p are integers ranging from 0 to 8 ions, or a combination thereof. Specific gel-forming ions include salts of alkaline earth elements along with aluminum; for example, magnesium ($Mg^{2+}$), calcium ($Ca^{2+}$), strontium ($Sr^{2+}$), barium ($Ba^{2+}$), aluminum ($Al^{3+}$), or a combination thereof. A more specific gel-forming ion is calcium ($Ca^{2+}$).

Anions are derived from polybasic organic or inorganic acids can also be used as crosslinking agents. Appropriate anionic crosslinking anions include, but not limited to, phosphate, sulfate, citrate, borate, succinate, maleate, adipate, and oxalate ions.

Non-ionic crosslinking agents include, aldehydes, epoxides, and melamine.

Mixtures of various crosslinking agents can be used if desired.

In one embodiment the crosslinked gum can be further crosslinked using non-ionic crosslinking agents to produce fiber matrix compositions having a higher crosslink density. This may be accomplished by additionally subjecting the ionically crosslinkable gum to non-ionic crosslinking mechanisms to treatment with a chemical crosslinking agent which reacts with groups present in the crosslinked gum such that covalent bonds are formed connecting different portions or different strands of the crosslinked gum. Non-ionic crosslinking may be carried out prior to, subsequent to, or concurrently with, ionic crosslinking to form the fiber matrix compositions. Suitable non-ionic crosslinking agents are polyfunctional compounds preferably having at least two functional groups reactive with one or more functional groups present in the gum. The crosslinking agent can contain one or more of carboxyl, hydroxy, epoxy, halogen, amino functional groups or hydrogen unsaturated groups, which are capable of undergoing facile nucleophilic or condensation reactions at temperatures up to about 100° C. with groups present along the gum backbone or in the gum structure. Suitable crosslinking reagents include polycarboxylic acids or anhydrides; polyamines; epihalohydrins; diepoxides; dialdehydes; diols; carboxylic acid halides, ketenes and like compounds. An exemplary crosslinking agent is glutaraldehyde.

The gel-forming ion is typically present in the form of a salt of the gel-forming ions described above. For example when the gel-forming ion is calcium ($Ca^{2+}$), exemplary calcium salts include calcium carbonate, calcium bicarbonate, calcium oxide, calcium chloride, calcium gluconate, calcium phosphate, calcium hydrogen phosphate, calcium dihydrogen phosphate, calcium stearate, calcium hydroxide, calcium lactate, calcium acetate, calcium sulfide, calcium sulfate, calcium citrate, or a combination thereof. Specific calcium salts include calcium citrate, calcium phosphate, calcium lactate, calcium sulfate, or a combination thereof. One more specific calcium salt is calcium citrate. A second more specific salt is calcium sulfate.

The compound containing the gel-forming ion may be present in a weight ratio of about 0.05:1 to about 1.5:1, relative to the water-soluble, crosslinkable, hydratable gum. Specifically, the compound containing the gel-forming ion may be present in a weight ratio of about 0.1:1 to about 1:1, relative to the water-soluble, crosslinkable, hydratable gum. In one specific composition, the gum may be a water-soluble gum including one or more of sodium alginate, potassium alginate, or ammonium alginate and the salt may be calcium citrate. In another specific composition, the gum may be a water-soluble gum including one or more of sodium alginate, potassium alginate, or ammonium alginate and the salt may be calcium sulfate.

The Hydrocolloid

In some embodiments, the hydraulically applied fiber matrix composition further includes a hydrocolloid. The hydrocolloid is usually prepared as part of the tackifier composition. Examples of hydrocolloids include gelatinized starch, gums, modified starch ethers or esters, proteins, cellulosics, synthetic polymers, minerals, or a combination thereof. When the hydrocolloid is in the form of a salt, it is useful that the hydrocolloid be in the form of an ammonium, sodium, or potassium salt in order to achieve solubility in water. Typically, the hydrocolloid is present in an amount of about 0-30 wt % of the hydraulically applied fiber matrix composition. Specifically, the hydrocolloid can be present in an amount of about 0-10 wt % of the hydraulically applied fiber matrix composition. In one specific embodiment, the hydraulically applied fiber matrix composition is in the form of a 3-dimensional matrix that includes a crosslinked gum including an alginate, and a hydrocolloid including a gelatinized starch, a starch derivative, guar, or *plantago*.

Exemplary gelatinized starches include, arracacha starch, arrowroot starch, banana starch, barley starch, breadfruit starch, buckwheat starch, canna starch, cassaya starch, *colacasia* starch, corn starch, katakuri starch, kudzu starch, malanga starch, millet starch, oat starch, oca starch, pea starch, polynesian arrowroot starch, potato starch, rice starch, rye starch, sago starch, sorghum starch, sweet potato starch, taro starch, water chestnut starch, wheat starch, yam starch, and mixtures thereof. In a specific embodiment, the gelatinized starch or starch derivative includes cornstarch or derivatized cornstarch. More specifically, the gelatinized starch or starch derivative includes starch in about 0-30 wt % of the hydraulically applied fiber matrix composition.

Exemplary gums include acacia gum, agar, carrageenan, cassia gum, or cellulose gum, furcellaran, gellan gum, guar gum, gum ghatti, karaya gum, larch gum, locust bean gum, pectin, *plantago*, tara gum, tragacanth, xanthan gum, or a combination thereof.

When the hydrocolloid includes a modified starch ether, or a modified starch ester, the modification may be carried out by reacting the hydrocolloid with various chemical agents to form carboxymethylated, crosslinked, hydroxypropylated, acetylated, ethylated, phosphated, sulfated, graft derivatives, methylated, or a combination thereof. Exemplary modified starch ethers and esters include carboxymethylated starch, hydroxypropylated starch, and hydroxypropylated carboxymethyl crosslinked starch.

Exemplary hydrocolloid combinations comprise a gelatinized starch, a modified starch ether, or a modified starch ester.

Exemplary proteins include collagen, furcellaran, egg whites, and gelatin.

Exemplary synthetic polymers include polyacrylamide, polyacrylate, polyvinyl alcohol, and polyethylene oxide.

Exemplary minerals include montmorillonite, bentonites (smectites), attapulgite, illite, chlorite, kaolinite, serpentine, and laponite.

The Mulch

In some embodiments, the hydraulically applied fiber matrix composition includes a mulch material. The mulch material in the hydraulically applied fiber matrix composition includes biodegradable fibers that can be natural or synthetic fibers, e.g., cellulosic fibers, protein fibers or synthetic polymer fibers. Natural fibers can include pulped or shredded cellulose fibers such as wood pulp, shredded wood, shredded paper (tissue, newsprint and the like), straw, cotton fiber, composted vegetation, fibrous sphagnum moss, peat moss, shredded stalks including shredded or ground-up corn stalks, ground-up plant material, and shredded pine straw (including needles, twigs, cones and small branches). Shredded vegetation can be dry before shredding. Protein fibers can include hair or gelatin. Biodegradable synthetic fibers can include reconstituted cellulose fibers such as rayon fibers, vinyl polymer fibers such as fibrous polyvinyl alcohol and polyamide fibers. For example fibers from shredded newsprint, are contemplated due to the low cost of shredded newsprint and because of the superior performance of such over larger fibers such as straw.

Additional Materials

The hydraulically applied fiber matrix compositions may also include granular material that can be biodegradable or not. Biodegradable granular material can include organic particulate prepared by milling hard vegetation such as wood, corncob, nutshells, seed hulls including grains hulls and bean hulls, seeds including corn and soybean, gourds, bark, certain mosses, composted vegetation and the like. Non-biodegradable granular material can include particulate soil builders, nutrients, and conditioners. Particulate soil builders can include mineral particles, for example milled vermiculite, perlite, sand, diatomaceous earth, gypsum, and the like. When used for hydroseeding seeds are added. When used to aid in germination or plant growth, particulate nutrients, such as fertilizer, for example containing nitrogen, potassium, and phosphate compounds, (e.g., ammonium nitrate, potassium nitrate, and potassium phosphate) can be added. Particulate soil conditioners such as milled limestone, iron sulfate, sulfur and such materials can also be added. Other materials that can be added include one or more of a surfactant, a herbicide, a pesticide, a sequestering agent, natural fiber, synthetic fiber, and a dye. Any of these materials can be added during preparation of the hydraulically applied fiber matrix formulation or at the time of spraying.

Formulations

In one embodiment, the tackifier composition can be prepared by dry blending the water-soluble crosslinkable hydratable gum and the compound containing the gel-forming ion. It is useful to dry blend any of the additional dry materials noted above, along with the crosslinkable hydratable gum and the compound containing the gel-forming ion. Dry blending the hydraulically applied fiber matrix formulation uniformly distributes the components of the formulation. Blending may be carried out using commercially available mechanical blenders employing ribbon and paddle, double cone, V blenders and vertical cone screw designs. Other methods of mixing known to one skilled in the art may be used.

In one typical composition, the hydrocolloid is present in an amount of from about 1 to about 95 wt % of the composition comprising a hydrocolloid; a water-soluble, crosslinkable, hydratable gum; and a gel-forming ion capable of crosslinking the water-soluble, crosslinkable, hydratable gum.

A typical tackifier composition includes; about 0-90 wt % of a hydrocolloid, about 2-95 wt % sodium alginate, and about 1-50 wt % calcium sulfate.

A specific tackifier composition includes about 65 wt % gelatinized starch or starch derivative, about 25 wt % sodium alginate, and about 10 wt % calcium sulfate. More specifically, the gelatinized starch can be a starch derivative.

Another specific tackifier composition includes about 0-90 wt % guar or *plantago*, about 2-95 wt % sodium alginate, and about 1-50 wt % calcium sulfate.

In another embodiment, the tackifier composition includes about 2 to about 100 wt % of a water-soluble crosslinkable hydratable gum and about 0 to about 95 wt % of hydrocolloid and about 0.01-20 wt % of a compound capable of crosslinking the water-soluble, crosslinkable, hydratable gum.

In another embodiment, the hydraulically applied fiber matrix composition includes about 1-30 wt % of a water-soluble crosslinkable hydratable gum, about 0 to about 30 wt % of a hydrocolloid, about 0.01-20 wt % of a compound capable of crosslinking the water-soluble, crosslinkable, hydratable gum, and about 70 to 99 wt % of a mulch

APPLICATION

A composition for application can also be prepared by mixing the water-soluble, crosslinkable, hydratable gum, and the gel-forming ion capable of crosslinking the water soluble, crosslinkable, hydratable gum with a liquid carrier. The hydraulically applied fiber matrix compositions may be applied to areas being coated using a liquid carrier. Specifically, the liquid carrier can be water or any liquid that includes water. The hydraulically applied fiber matrix composition, which is packed and shipped in bails or bags, can be added to the mixing tank of a standard hydroseeding machine that uses some form of agitation. Fertilizer, seed, weed killer, dye, and other additives can also be added at this time if desired. Then, one or two layers of the hydraulically applied fiber matrix composition in water can be sprayed on top of the seed bed to form the protective, water-absorbent mulch matrix layer over the seed bed. Contacting a natural ground surface with a composition that includes a water-soluble, crosslinkable, hydratable gum, and a gel-forming ion capable of crosslinking the water-soluble, crosslinkable, hydratable gum provides an effective method of erosion control.

If desired, the surface to be coated with the hydraulically applied fiber matrix formulation can be prepared before spraying or coating with the fiber matrix formulation. For example, for hydroseeding; seed, fertilizer, other additives, and a relatively small amount of the hydraulically applied fiber matrix formulation may be applied to the seed bed before spraying or otherwise coating with the hydraulically applied fiber matrix formulation.

The rate of crosslinking can be controlled by the amount of water-soluble, crosslinkable, hydratabale gum, and the solubility of the salt of the gel-forming ion. Gel-forming ions that are water-soluble will crosslink the gum faster, while less soluble ions will crosslink the gum more slowly. It should be noted that even salts having very low solubility are useful, as additional crosslinking ion will dissolve in the hydraulically applied fiber matrix solvent as some of the ion reacts to crosslink the crosslinkable gum and is removed from solution. In addition, a sequestering agent, such as sodium hexametaphosphate, trisodium phosphate, tetrasodium phosphate, sodium-tripolyphosphate, sodium citrate, sodium carbonate, or ethyelenediaminetetracetic acid (EDTA) can be used to temporarily sequester (i.e., "tie up") the gel-forming ion to allow the crosslinkable gum to fully hydrate and delay crosslinking.

DEFINITIONS

Unless stated otherwise, the following terms and phrases as used herein are intended to have the following meanings:

"Agar" refers to a gelatinous substance derived from seaweed. The gelling agent is an unbranched polysaccharide obtained from the cell walls of some species of red algae, primarily from the genera *Gelidium* and *Gracilaria*, or seaweed (*Sphaerococcus euchema*). Commercially it is derived primarily from *Gelidium amansii*. Chemically, agar is a polymer made up of subunits of the sugar galactose. Agar polysaccharides serve as the primary structural support for the algae's cell walls.

"Acacia gum" also known as gum arabic, gum acacia, chaar gund, char goond or meska, is a natural gum made of hardened sap taken from two species of the *acacia tree; Acacia senegal* and *Acacia seyal*. Acacia gum is a complex mixture of polysaccharides and glycoproteins.

"Acetylated" refers to a compound that has been prepared by the introduction of a acetyl function —(C—O)—CH$_3$ into an organic compound. As used herein it also refers to the introduction of any group having the structure —(C—O)—R into a compound, where R is an aliphatic group. The reaction usually involves the reaction of an OH group to form an ester having the structure —O—(C—O)—CH$_3$, or —O—(C—O)—R.

"Alkaline earth metals" refers to refers to metals of Group IIA of the Periodic Table of Elements, e.g., magnesium (Mg) and calcium (Ca).

"Ammonium salt" refers to salts of compounds having a cation with the formula $NH_4^+$. The ammonium cation has a molecular weight of 18.05. Ammonium cation also refers to salts of compounds having a cation with the formula $NR_4^+$ where R is a hydrogen or a monovalent organic substituents, e.g., ethylammonium ($C_2H_5NH_3^+$) and tetra-butylammonium [$(C_4H_9)N^+$].

"Ammonium sulfate" refers to $(NH_4)_2SO_4$, is an inorganic salt with a number of commercial uses. The most common use is as a soil fertilizer. It contains 21% nitrogen as ammonium cations, and 24% sulfur as sulfate anions. In fertilizer the purpose of the sulfate is to reduce the soil pH.

"Arracacha starch" refers to the starch obtained from arracacha (*Arracacia xanthorriza*). It is a garden root vegetable originally from the Andes, somewhat intermediate between the carrot and celery. Its starchy taproot is a popular food item in South America, especially in Brazil where it is a major commercial crop. The plant is also called apio criollo ("Creole celery") in Venezuela, zanahoria blanca ("white carrot") in Ecuador, virraca in Peru, and mandioquinha ("little cassaya") or batata-baroa in Brazil. As used herein, the term Arracacha starch refers to starches obtained from all of these plants.

"Arrowroot starch" refers to starch obtained from Arrowroot (Maranta arundinacea), a large perennial herb of genus Maranta found in rainforest habitats. Arrowroot is also the name of the edible starch from the rhizomes (rootstock) of West Indian arrowroot.

"Attapulgite," also known as palygorskite, is a magnesium aluminum phyllosilicate. It has the chemical formula (Mg, Al)$_2$Si$_4$O$_{10}$(OH).4(H$_2$O) and occurs in a type of clay soil common to the Southeastern United States. Attapulgite is one of the types of fuller's earth.

"Banana starch" refers to the starch obtained from bananas and plantains. The starch content of plantains is about 25%.

"Barley starch" refers to the starch obtained from any species of the barley plant. Two-rowed barley is classified as *Hordeum* distichon, six-rowed barley as *Hordeum vulgare*, and irregular barley as *Hordeum* irregulare.

"Breadfruit starch" refers to the starch obtained from breadfruit (Artocarpus altilis), a species of flowering tree in the mulberry family, Moraceae. It is native to the Malay Peninsula and western Pacific islands. Breadfruit has also been widely planted in tropical regions elsewhere.

"Buckwheat starch" refers to the starch obtained from buckwheat and in particular to plants in two genera of the dicot family Polygonaceae: the Eurasian genus *Fagopyrum*, and the North American genus *Eriogonum*. The groats (hulled grains) contain from 71 to 76% starch.

"Calcium acetate: refers to the chemical compound having the formula Ca(C$_2$H$_3$O$_2$)$_2$ and it hydrates. It is the calcium salt of acetic acid. Its standard name is calcium acetate, while calcium ethanoate is the systematic IUPAC name. An older name is acetate of lime. It has a molecular weight of 158.17 g/mol. The anhydrous form is very hygroscopic; therefore the monohydrate [Ca(C$_2$H$_3$O$_2$)$_2$●H$_2$O] is the common form.

"Calcium bicarbonate" refers to the chemical compound having the formula (Ca(HCO$_3$)$_2$). It is also called calcium hydrogen carbonate, does not refer to a known solid compound; it exists only in aqueous solution containing the ions calcium (Ca$^{2+}$), dissolved carbon dioxide (CO$_2$), bicarbonate (HCO3), and carbonate (CO$_3^{2-}$). It has a molecular weight of 162.115 g/mol.

"Calcium carbonate" refers to the chemical compound having the formula CaCO$_3$. It is the main component of shells of marine organisms, snails, pearls, and eggshells. Limestone is a form of calcium carbonate. It has a molecular weight of 100.087 g/mol.

"Calcium chloride" refers to the compound CaCl$_2$ and its hydrates. They have molecular weights of 110.98 g/mol (anhydrous); 128.999 g/mol (monohydrate); 147.014 g/mol (dihydrate); 183.045 g/mol (tetrahydrate); and 219.08 g/mol (hexahydrate). It has a solubility in water of 74.5 g/100 mL (20° C.). Limestone is a form of calcium chloride. The anhydrous form is hygroscopic.

"Calcium citrate" is the calcium salt of citric acid and refers to the compound having the formula Ca$_3$(C$_6$H$_5$O$_7$)$_2$ and its hydrates. Anhydrous calcium citrate has a molecular weight of 496.46 g/mol. Calcium citrate tetrahydrate has a molecular weight of 570 g/mol.

"Calcium gluconate" refers to the calcium salt of D-gluconic acid. It has the formula C$_{12}$H$_{22}$CaO$_{14}$ and a molecular weight of 430.373.

"Calcium dihydrogen phosphate" refers to the compound having the chemical formula Ca(H$_2$PO$_4$)$_2$. It is also known as monocalcium phosphate. It has a molecular weight of 234.05 g/mol. As used herein it also refers to the commonly found monohydrate, Ca(H$_2$PO$_4$)$_2$●H2O.

"Calcium hydrogen phosphate," also known as dicalcium phosphate, refers to the compound having the chemical formula CaHPO$_4$, and its hydrates. It is usually found as the dihydrate, with the chemical formula of CaHPO$_4$•2H$_2$O, but it can be thermally converted to the anhydrous form. Anhydrous calcium hydrogen phosphate has a molecular weight of 136.06 g/mol.

"Calcium hydroxide" refers to the compound having the chemical formula Ca(OH)$_2$. It has a molecular weight of 74.093 g/mol. Calcium hydroxide is traditionally called slaked lime, hydrated lime, slack lime, or pickling lime.

"Calcium lactate" is the calcium salt of lactic acid, and refers to the compound having the formula Ca(C$_3$H$_5$O$_2$)$_2$ and its hydrates. Calcium lactate has a molecular weight of 218.22 g/mol. It is also known as 2-hydroxypropanoic acid calcium salt. Its pentahydrate is known as 2-hydroxypropanoic acid calcium salt pentahydrate.

"Calcium oxide" refers to the compound having the chemical formula CaO. It has a molecular weight of 56.077 g/mol. Calcium oxide (CaO) is commonly known as burnt lime, lime, or quicklime.

"Calcium phosphate" refers to the compound having the chemical Ca$_3$(PO$_4$)$_2$. It has a molecular weight of 310.177 g/mol. It is also referred to as tricalcium phosphate.

Calcium phosphate also refers to a family of minerals containing calcium ions (Ca$^{2+}$) together with orthophosphates (PO$_4^{3-}$), metaphosphates or pyrophosphates (P$_2$O$_7^{4-}$) and occasionally hydrogen or hydroxide ions.

"Calcium stearate" is the calcium salt of stearic acid, and refers to the chemical compound having the formula Ca(C$_{18}$H$_{35}$O$_2$)$_2$. It has a molecular weight of 607.02 g/mol.

"Calcium sulfate" refers to the compound having the chemical formula CaSO$_4$. It has a molecular weight of 136.14 g/mol. The hemihydrate (CaSO$_4$.~0.5H$_2$O) is better known as plaster of Paris, while the dihydrate (CaSO$_4$.2H$_2$O) occurs naturally as gypsum. The anhydrous form occurs naturally as β-anhydrite.

"Calcium sulfide" refers to the compound having the chemical formula CaS. has a molecular weight of 72.143 g/mol.

"*Canna* starch" refers to a starch isolated from rhizomes of edible canna (Canna edulis). It has the distinction of containing the largest granules of any of the common food starches.

"Carboxymethyl cellulose" (CMC) refers to a cellulose derivative with carboxymethyl groups (—CH$_2$—COOH) bound to some of the hydroxyl groups of the glucopyranose monomers that make up the cellulose backbone. CMC is used in food science as a viscosity modifier or thickener, and to stabilize emulsions in various products including ice cream.

"Carboxymethyl" refers to the chemical substituent —CH$_2$—COOH.

"Carboxymethylene" refers to the chemical substituent =CH—COOH.

"Carrageenan" refers to a family of polysaccharide gums extracted from red seaweeds. They are composed of linear sulfated high molecular weight polysaccharides made up of repeating galactose units and 3,6 anhydrogalactose (3,6-AG), both sulfated and nonsulfated. The units are joined by alternating alpha 1-3 and beta 1-4 glycosidic linkages. The primary differences which influence the properties of kappa, iota and lambda carrageenan are the number and position of the ester sulfate groups on the repeating galactose units. Higher levels of ester sulfate lower the solubility temperature of the carrageenan and produce lower strength gels, or contribute to gel inhibition (lambda carrageenan).

"Cassaya starch" (*Manihot esculenta*; also called yuca, yucca, or manioc) refers to a woody shrub of the Euphorbiaceae (spurge family) native to South America. Its edible starchy tuberous root is a major source of carbohydrates. The flour made of the roots is called tapioca.

"Cassia gum" refers to a gum made from the endosperm of *Senna obtusifolia* (also called *Cassia obtusifolia* or *Cassia tora*). It is a hydrocolloid used as a food additive as a thickener and gelling agent.

"Cellulose" refers to an organic compound with the formula (C$_6$H$_{10}$O$_5$)$_n$, a polysaccharide consisting of a linear chain of several hundred to over ten thousand β(1→4) linked D-glucose units "Cellulose gum" refers to a hydrocolloid or thickening agent derived from cellulose. It is a common hydrocolloid thickening agent.

"Cellulosic material" or "cellulosic" refers to materials derived from cellulose.

"Chlorite" refers to a group of phyllosilicate minerals. Chlorites can be described by the following four end members based on their chemistry via substitution of the following four elements in the silicate lattice; Mg, Fe, Ni, and Mn: clinochlore [(Mg$_5$Al)(AlSi$_3$)O$_{10}$(OH)$_8$]; chamosite [(Fe$_5$Al)(AlSi$_3$)O$_{10}$(OH)$_8$]; nimite [(Ni$_5$Al)(AlSi$_3$)O$_{10}$(OH)$_8$]; and pennantite: [(Mn,Al)$_6$(Si,Al)$_4$O$_{10}$(OH)$_8$]

"Collagen" refers to a protein of connective tissue in animals. Gelatin is derived from the partial hydrolysis of collagen.

"Corn starch" refers to the starch of the corn (maize) grain. It is used as a thickening agent and adhesive. As the starch is heated, the molecular chains unravel, allowing them to entangle with other starch chains thereby, thickening the liquid.

"Crosslink," "cross-linking" or "crosslinking", "crosslinked" or "crosslinkable" refers to bonds that link one polymer chain to another. They can be covalent bonds or ionic bonds. "Polymer chains" can refer to synthetic polymers or natural polymers (such as proteins). In the synthetic polymer science field, "crosslinking" usually refers to the use of crosslinks to promote a difference in the polymers' physical properties.

"Derivatized corn starch" refers to starch that has been reacted with another chemical compound to modify its properties.

"Dimethylol urea" refers to a 1,3-bis(hydroxymethyl)urea. It has the chemical structure:

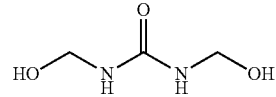

"Dry Blending" refers to blending of two or more materials without the use of significant and appreciable amounts of solvent to dissolve one or more of the materials. Materials can be dry blended even if they contain some moisture. For example, sodium alginate is capable of being dry blended even though it contains less than about 20 wt % moisture.

"Egg whites" refers to the clear liquid (also called the albumen or the glair/glaire) contained within an egg. It is the cytoplasm of the egg. It is made of long chains of amino acids. In a raw egg, these chains are raveled up in a specifically arranged compact mass. Chemical bonds and interactions between the amino acids within each protein hold this mass in a specific shape and stop it from unraveling. As an egg cooks, the heat causes the bonds within the proteins to break referred to as denaturation. As these proteins chains unfold and entangle with other proteins, new bonds form between these amino acids and the amino acids of neighboring proteins, causing the texture to change and the egg white to become firm.

"Furcellaran gum" refers to Danish agar; a sulfated polysaccharide extracted from the red alga, *Furcellaria fastigiata*. It is structurally similar to carrageenan and is used as a gelling agent.

"Gel" refers to a colloidal suspension of a solid dispersed in a liquid. They form a semirigid solid.

"Gelatin" refers to a translucent, colorless, odorless, brittle, nearly tasteless solid protein substance, derived from the collagen inside animals' skin and bones. It is an irreversibly hydrolyzed form of collagen. Gelatin is commonly used as a gelling agent in food, pharmaceuticals, photography, and cosmetic manufacturing. Substances containing gelatin or functioning in a similar way are called gelatinous.

"Gelatinization" or "starch gelatinization" is a process that breaks down the intermolecular bonds of starch molecules in the presence of water and heat, allowing the hydrogen bonding sites (the hydroxyl hydrogen and oxygen) to engage more water. Penetration of water increases randomness in the general structure and decreases the number and size of crystalline regions. Crystalline regions do not allow water entry. Heat causes such regions to be diffused, so that the chains begin to separate into an amorphous form. This process is used in cooking to make roux sauce, pastry, custard, or popcorn. Gelatinization is also known as the thickening of a liquid. The starch grains/flour granules absorb the liquid. When heated the grains/granules swell and then burst, releasing starch into the liquid. The granules/grains swell to 5 times their original size "Gel-forming ion" refers to a metal ion such as calcium ($Ca^{2+}$) that causes a material such as a protein, polysaccharide to crosslink and forms a gel.

"Gellan gum" refers to a water-soluble polysaccharide produced by Sphingomonas elodea, a bacterium. It is also known commercially as Phytagel or Gelrite.

"Graft derivatives" refers to polymers including molecules in which the main backbone chain of atoms has attached to it at various points, side chains containing different atoms or groups from those in the main chain. The main chain may be a copolymer or may be derived from a single monomer.

"Guar gum" refers to a polysaccharide composed of the sugars galactose and mannose. The backbone is a linear chain of β 1,4-linked mannose residues to which galactose residues are 1,6-linked at every second mannose, forming short sidebranches. Either borax or calcium can crosslink guar gum, causing it to gel. Guar gum is obtained from the seeds of the guar gum bush (Leguminosa: *Cyamopsis tetragonolobus*), "Gum ghatti" or "Indian gum" refers to a polysaccharide exudate from the stems of *Anogeissus latifolia*.

"Gum" refers to polysaccharides of natural origin, capable of causing a large viscosity increase in solution, even at small concentrations. They are used as thickening agents, gelling agents, emulsifiers, and stabilizers. Most often, these gums are found in the woody elements of plants or in seed coatings.

"Gypsum" refers to a very soft mineral composed of calcium sulfate dihydrate, with the chemical formula $CaSO_4.2H_2O$.

"Hydratable gum" refers to a gum that forms a hydrocolloid in water.

"Hydraulically applied fiber matrix compositions" refers to manufactured, temporary, degradable, fibrous materials that are mixed with water and hydraulically applied as a slurry designed to reduce soil erosion and assist in the establishment and growth of vegetation.

"Hydrocolloid" refers to a colloid system wherein the colloid particles are dispersed in water. A hydrocolloid has colloid particles spread throughout water, and depending on the quantity of water available, that can take place in different states, e.g., gel or sol (liquid). Hydrocolloids can be either irreversible (single-state) or reversible. For example, agar, a reversible hydrocolloid of seaweed extract, can exist in a gel and sol state, and alternate between states with the addition or elimination of heat.

Hydrocolloids are thickening, gelling, and stabilizing agents, which play a major role in numerous food and beverage products. The water-binding properties of hydrocolloids are used for viscosifying, and gelling purposes in food. Several of the products also interact with proteins, allowing for protein stabilization and protection applications. When added to water, the gums described herein are believed to form hydrocolloids.

"Hydroseeding" (also known as hydraulic mulch seeding or hydra-seeding) is a planting process that utilizes a slurry of seed and mulch. The mulch in the hydroseed mixture helps maintain the moisture level of the seed and seedlings. The slurry often has other ingredients including fertilizer, tackifying agents, green dye, and other additives. When used without seed, the process is referred to as "Hydraulic mulching."

"Hydroxypropyl cellulose" (HPC) refers to an ether of cellulose in which some of the hydroxyl groups in the repeating glucose units have been hydroxypropylated forming —$OCH_2CH(OH)CH_3$ groups. Hydroxypropyl cellulose is a derivative of cellulose with both water solubility and organic solubility.

"Hydroxypropyl methylcellulose" refers to an ether of cellulose in which some of the hydroxyl groups in the repeating glucose units have been hydroxypropylated forming —$OCH_2CH(OH)CH_3$ groups and others have been methylated forming —$OCH_3$ groups. It has the property of known as reversible thermal gelation—it forms a gel when heated but returns to solubility when cooled. It is also known as hypromellose.

"Hydroxypropyl" refers to the chemical substituent —$OCH_2CH(OH)CH_3$.

"Illite" refers to a non-expanding, clay-sized, micaceous mineral. Illite is a phyllosilicate or layered alumino-silicate. The chemical formula is given as $(K,H_3O)(Al,Mg,Fe)_2(Si,Al)_4O_{10}[(OH)_2 (H_2O)]$.

"Kaolinite" refers to a clay mineral with the chemical composition $Al_2Si_2O_5(OH)_4$.

"Karaya gum" refers to a vegetable gum produced as an exudate by trees of the genus *Sterculia*. Chemically, gum karaya is an acid polysaccharide composed of the sugars galactose, rhamnose and galacturonic acid.

"Katakuri starch" or "katakuriko" refers to a starch originally processed from the corm of katakuri (*Erythronium japonicum*) a species of lily native to Japan, Korea and northeastern China. Katakuriko is often used as a sauce thickener.

"Konjac mannan gum" refers to a polysaccharide starch derived from the Konjac plant (*Amorphophallus konjac*). The dried corm of the konjac plant contains around 40% glucomannan gum.

"Kudzu starch" refers to the starch derived from the root of the Kudzu plant *Pueraria lobata* (syn. *P. montana, P. thunbergiana*).

"Laponite" refers to a synthetic sodium magnesium fluorosilicate clay which swells to produce a clear, colorless thixotropic gel when dispersed in water.

"Larch gum" refers to polysaccharide of galactose and arabinose found in the western larch tree (*Larix occidentalis*). It is a hydrocolloid and is readily dispersed in water.

"Locust bean gum" (also known as carob gum, carob bean gum, and carobin) refers to a galactomannan vegetable gum extracted from the endosperm portion of the seeds of the Carob tree. It is a hydrocolloid and is used as a thickening agent and gelling agent in food technology. It is soluble in hot water. It consists chiefly of high molecular weight hydrocolloidal polysaccharide, composed of galactose and mannose units combined through glycosidic linkages, which may be described chemically as galactomannan. It is dispersible in either hot or cold water and may be converted to a gel by the addition of small amounts of sodium borate. Its main use in food is as a stabilizer and thickener.

"Magnesium Oxide" refers to the chemical compound having the formula MgO.

"Malanga starch" refers to the starch derived from the starchy corm of Xanthosoma, a genus of about 50 species of tropical and sub-tropical arums in the flowering plant family, Araceae.

"Methylated" refers to the product formed by adding a methyl group to a compound. For example methylation of cellulose produces methyl cellulose.

"Millet starch" refers to the starch derived from millet, the common name for various species of plants belonging to different genera but all within the grass family, "Mineral" refers to a naturally occurring solid formed through geological processes that has a characteristic chemical composition, a highly ordered atomic structure, and specific physical properties. A rock, by comparison, is an aggregate of minerals and/or mineraloids, and need not have a specific chemical composition. Minerals range in composition from pure elements and simple salts to very complex silicates with thousands of known forms. The study of minerals is called mineralogy.

"Modified starch ester" refers to a starch in which one or more of the hydroxyl groups have been reacted to form ester groups. The reaction usually involves a reaction to replace the a hydrogen of the of an OH group on the starch with a —O—(C=O)—CH$_3$ or —O—(C—O)—R group (where R is an aliphatic group).

"Modified starch ether" refers to a starch in which one or more of the hydrogens on the starch has been replaced by the carbon of an organic groups. For example methylation of a starch replaces the OH group with an OCH$_3$ group.

"Moisture" refers to the presence of water, often in small amounts within a substance. Typically, water-soluble, crosslinkable, hydratable gums include less than about 20 wt % moisture. They are dry to the touch and are capable of dry blending.

"Montmorillonite bentonites (smectites) refers to a very soft phyllosilicate group of minerals that typically form in microscopic crystals, forming a clay. Chemically it is hydrated sodium calcium aluminium magnesium silicate hydroxide $(Na, Ca)_{0.33}(Al,Mg)_2(Si_4O_{10})(OH)_2 \cdot nH_2O$. Montmorillonite swells with the addition of water.

"Mulch" refers to is a covering placed around plants (or covering the ground in lieu of plants), to prevent the growth of weeds. If placed around plants, a mulch provides additional benefits, including the diminution of erosion and water loss, and the regulation of soil temperature. In addition, upon decomposition (for organic mulches), mulches serve as soil amendments. Mulch selection is usually based on appearance, as well as on all the practical considerations mentioned above.

"Oat starch" refers to the starch derived from oats (genus Avena of the family Poaceae (or Gramineae). It can be isolated from oat groats or oat flour.

"Oca starch" refers to the starch derived from Oxalis tuberosa, an annual plant that overwinters as underground stem tubers. These tubers are known as oca, oka, or New Zealand Yam.

"Pea starch" refers to starch derived from the pea plant.

"Pectin" refers to the complex set of polysaccharides that are present in most primary cell walls and particularly abundant in the non-woody parts of terrestrial plants. The characteristic structure of pectin is a linear chain of α-(1-4)-linked D-galacturonic acid that forms the pectin-backbone, a homogalacturonan. Into this backbone, there are regions where galacturonic acid is replaced by (1-2)-linked L-rhamnose. From the rhamnose residues, sidechains of various neutral sugars branch off. It is used as a gelling agent.

"Phosphated" refers to a compound such as a starch that has been reacted to form phosphates —$OPO_3^{2-}$. For example one or more of the hydroxyl groups on a starch can be "phosphated" to form —$OPO_3^{2-}$ groups.

"*Plantago*" refers to a genus of about 200 species of small, inconspicuous plants commonly called plantains. It is a source of psyllium, which is used for its mucilage. Mucilage describes a group of clear, colorless, gelling agents.

"Polyacrylamide" [poly(2-propenamide) or poly(1-carbamoylethylene)] refers to a polymer [—CH$_2$CH—(CONH$_2$)]. It can form a hydrocolloid that expands when placed in water.

"Polyacrylate" refers to a group of polymers derived from the acrylate group [—CH$_2$CH—((C=O)(R))]. An example is polymethylacrylate [—CH$_2$CH—((C=O)(OCH$_3$)], a synthetic polymer used to absorb water in diapers, pads, etc. It can absorb up to 400 times its own mass.

"Polyethylene oxide" also known as "poly(ethylene glycol)" (PEG) and "polyoxyethylene" (POE), refers to an oligomer or polymer of ethylene oxide. When mixed with water it can form a gel. Polyethylene oxides can form hydrocolloids.

"Polynesian arrowroot starch" refers to the starch derived from Tacca leontopetaloides is a species of Tacca. The tubers of Polynesian arrowroot contain the starch.

"Polyvinyl alcohol" refers a water-soluble synthetic polymer having the structure [—(CH$_2$CH(OH))—]. It is used as a thickener in water-based systems.

"Potassium carbonate" refers to the chemical compound having the formula K$_2$CO$_3$.

"Potassium salt" refers to refers to a chemical compound containing K$^+$ ions. Potassium salts are often ionic and water-soluble.

"Potato starch" refers to the starch extracted from the plant cells of the root tuber of potatoes. Potato starch has a low gelatinization temperature and high swelling power in water.

"Gelatinized starch" refers to starch that has been cooked and then dried in the starch factory on a drum drier or in an extruder making the starch cold water-soluble.

"Protein" refers to organic compounds made of amino acids arranged in a linear chain.

"Rice starch" refers to the starch obtained from the seed of the plant Orzya sativa. It can be used as a thickening agent with water.

"Rye starch" refers to refers to the starch obtained from the seed of the plant *Secale cereale*.

"Sequestering agent" refers to compounds that form a coordination complex with metallic ions so that the usual precipitation reactions of the metallic ions are prevented. For example, calcium soap precipitates are not produced from hard water treated with certain inorganic sequestering agents such as polyphosphates and metaphosphates (often referred to as hexametaphosphates). The term "sequestration" refers to any instance in which an ion is prevented from exhibiting its usual properties due to close combination with added material. Two groups of organic sequestering agents are aminopoly-carboxylic acids such as ethylenediaminetetraacetic acid and hydroxycarboxylic acids such as gluconic, citric and tartaric acids.

"Sago starch" refers to the starch extracted from the pith of sago palm stems, Metroxylon sagu. It is used as a thickener.

"Serpentine" refers to a group of common rock-forming hydrous magnesium iron phyllosilicate (($Mg$, $Fe)_3Si_2O_5(OH)_4$) minerals having the chemical composition (($Mg$, $Fe)_3Si_2O_5(OH)_4$).

"Sodium alginate" refers to the sodium salt of alginic acid. Its empirical chemical formula is $NaC_6H_7O_6$. Alginate is a polysaccharide produced from brown seaweed. Brown seaweed contains mixed alginic acid salts, which are the basic raw materials used in the production of alginates. It forms as a gum, when extracted from the cell walls of brown algae, and is used by the food industry to increase viscosity and as an emulsifier.

"Sodium salt" refers to a chemical compound containing $Na^+$ ions. Sodium salts are usually ionic and water-soluble.

"Starch" refers to is a polysaccharide carbohydrate consisting of a large number of glucose units joined by glycosidic bonds. Starch is produced by all green plants as an energy store and is a major food source for humans.

"*Sorghum* starch" refers to a genus of numerous species of grasses. *Sorghum* is a starch raw material and the starch extraction process resembles that of corn wet milling. It consists of amylopectin, a branched-chain polymer of glucose, and amylose, a straight-chain polymer. *Sorghum* starch granules are typically 3-27 microns with 16 microns in average.

"Starch derivative" refers to starch that has been reacted to modify its properties. For example, one or more of the OH groups in starch may carboxymethylated, crosslinked, hydroxypropylated, acetylated, phosphated, sulfated, graft derivatized, methylated, or a combination thereof. Starches containing one or more of these features are included within this definition.

"Sulfated" refers to a compound such as a starch that has been reacted to form sulfates-$OSO_3^-$. For example one or more of the hydroxyl groups on a starch can be "sulfated" to form —$OSO_3^-$ groups.

"Sweet potato starch" refers to the starch derived from the sweet potato (*Ipomoea batatas*). Sweet potato starch is usually derived from the large tuberous root.

"Synthetic polymer" refers to polymers that have been prepared industrially either by modification of existing polymers, for example carboxy methyl cellulose and poly ethylene glycol; or by synthesis from starting materials, for example nylon and polyacrylates.

"Tara gum" refers to the gum derived from the *Caesalpinia spinosa*, a small leguminous tree or thorny shrub. Tara gum is a white or beige nearly odorless powder that is produced by separating and grinding the endosperm of *C. spinosa* seeds. The major component of the gum is a galactomannan polymer similar to the main components of guar and locust bean gums that are used widely in the food industry. Tara gum is used as a thickening agent and stabilizer in a number of food applications.

"Taro starch" or "*Colacasia* starch" refers to the starch obtained from the edible tubers of the *Colocasia esculenta* plant and other members of the genus. It is a tropical plant grown primarily as a vegetable food for its edible corm. Taro corms are very high in starch.

"Tragacanth" or "tragacanth gum" refers to the gummy exudation from the stem of *Astragalus gummifer*, Labillardiere (N.O. Leguminosoe), and other species of *Astragalus*. It is a viscous, odorless, tasteless, water-soluble mixture of polysaccharides.

"Water chestnut starch" refers to starch obtained from the Chinese water chestnut (*Eleocharis dulcis*; synonyms *E. equisetina, E. indica, E. plantaginea, E. plantaginoides, E. tuberosa, E. tum ida*), more often called simply the water chestnut. It is a grass-like sedge grown for its edible corms. The corms are rich in carbohydrates (about 90 percent by dry weight); especially starch (about 60 percent by dry weight). The water chestnut is actually not a nut at all, but an aquatic vegetable that grows in marshes.

"Wheat starch" refers to the starch obtained from wheat (*Triticum* spp.) a worldwide cultivated grass. Much of the carbohydrate fraction of wheat is starch.

"Xanthan gum" refers to a polysaccharide used as a food additive and rheology modifier. It is produced by fermentation of glucose or sucrose by the *Xanthomonas campestris* bacterium.

"Yam starch" refers to the starch derived from some species in the genus *Dioscorea* (family Dioscoreaceae). Their tubers are rich in starch.

EXAMPLES

The following examples are provided to illustrate the practice of the present invention and the invention is not meant to be limited thereby.

The following materials were used:

Sodium Alginate is available from FMC BioPolymer, Philadelphia, Pa.

Potato Starch PC 6390 is potato starch that has been treated with carboxymethylation, hydroxypropylation, and crosslinking. It is available from Chemstar Products Company, Minneapolis, Minn.

Corn Starch PC 1110 is a gelatinized corn meal. It is available from Chemstar Products Company, Minneapolis, Minn.

Calcium citrate is available from Sigma Aldrich, St. Louis, Mo.

Calcium sulfate is available from Sigma Aldrich, St. Louis, Mo.

The wood-based mulch used was Excel Fibermulch II (100% wood base). It is available from Western Excelsior, Mancos, Colo.

The wood fiber and shredded paper blend mulch used was Terra-Blend Terra Mulch. It is available from Profile Products, Buffalo Grove, Ill.

Preparation and Coating of Samples

Example 1

A 30 g hydraulically applied fiber matrix formulation was prepared including 3 g of tackifier composition and 27 g of mulch. All materials were placed in a covered plastic container, and shaken for a few minutes to evenly distribute the ingredients.

| Hydraulically Applied Fiber Matrix Formulation | | |
|---|---|---|
| Component | Amount | Amount % |
| Tackifier | | |
| Sodium Alginate | 1.80 g | 60% |
| Calcium Citrate | 1.20 g | 40% |
| Total Tackifier | 3.0 g | 100% |
| Mulch - Wood/Paper Blend | 27 g | |
| Hydraulically Applied Fiber Matrix Formulation | 30 g | |

The Tackifier was poured into a beaker containing 500 g of water. The mixture was stirred for 20 minutes using an overhead paddle stirrer at 250 rpm. The well-dispersed, mixture was poured onto a standard sheet of CDX plywood to form mulch cakes approximately 8" in diameter and ½-¾" thick and allowed to dry at ambient room temperature of approximately 75° F. until fully dried.

Example 2

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.75 g | 25% |
| Potato Starch PC 6390 | 1.20 g | 40% |
| Corn Starch PC 1110 | 0.675 g | 22.5% |
| Calcium Citrate | 0.375 g | 12.5% |
| Total Tackifier | 3.0 g | 100% |
| Mulch - Wood/Paper Blend | 27 g | |
| Hydraulically Applied Fiber Matrix Formulation | 30 g | |

Example 3

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.75 g | 25% |
| Potato Starch PC 6390 | 1.20 g | 40% |
| Corn Starch PC 1110 | 0.675 g | 22.5% |
| Calcium Citrate | 0.375 g | 12.5% |
| Total Tackifier | 3.0 g | 100% |
| Mulch - Wood Fiber | 27 g | |
| Hydraulically Applied Fiber Matrix Formulation | 30 g | |

Example 4

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar Gum | 2.1 g | 70% |
| Corn Starch PC 1110 | 0.30 g | 10% |
| Calcium Citrate | 0.6 g | 20% |
| Total Tackifier | 3.0 g | 100% |
| Mulch - Wood/Paper Blend | 27 g | |
| Hydraulically Applied Fiber Matrix Formulation | 30 g | |

Example 5

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.90 g | 30% |
| Potato Starch PC 6390 | 1.65 g | 55% |
| Calcium Citrate | 0.45 g | 15% |
| Total Tackifier | 3.0 g | 100% |
| Mulch - Wood Fiber | 27 g | |
| Hydraulically Applied Fiber Matrix Formulation | 30 g | |

Example 6

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.90 g | 30% |
| Potato Starch PC 6390 | 1.65 g | 55% |
| Calcium Citrate | 0.45 g | 15% |
| Total Tackifier | 3.0 g | 100% |
| Mulch - Wood/Paper Blend | 27 g | |
| Hydraulically Applied Fiber Matrix Formulation | 30 g | |

Example 7

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.80 g | 60% |
| Calcium Citrate | 1.20 g | 40% |
| Total Tackifier | 3.0 g | 100% |
| Mulch - Wood Fiber | 27 g | |
| Hydraulically Applied Fiber Matrix Formulation | 30 g | |

Example 8

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Xanthan Gum | 0.60 g | 20% |
| Potato Starch PC 6390 | 2.40 g | 80% |
| Total Tackifier | 3.0 g | 100% |
| Mulch - Wood Fiber | 27 g | |
| Hydraulically Applied Fiber Matrix Formulation | 30 g | |

Example 9

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar Gum | 3.00 g | 100% |
| Total Tackifier | 3.00 g | 100% |
| Mulch - Wood Fiber | 27 g | |
| Hydraulically Applied Fiber Matrix Formulation | 30 g | |

Example 10

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar Gum | 2.10 g | 70% |
| Corn Starch PC 1110 | 0.30 g | 10% |
| Calcium Citrate | 0.60 | 20% |
| Total Tackifier | 3.0 g | 100% |
| Mulch - Wood Fiber | 27 g | |
| Hydraulically Applied Fiber Matrix Formulation | 30 g | |

Example 11

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Xanthan Gum | 2.40 g | 80% |
| Potato Starch PC 6390 | 0.30 g | 20% |
| Total Tackifier | 3.0 g | 100% |
| Mulch - Wood/Paper Blend | 27 g | |
| Hydraulically applied fiber matrix Formulation | 30 g | |

Example 12

A Hydraulically Applied Fiber Matrix Formulation was prepared, dispersed, and coated as in Example 1 but containing the following materials:

| Hydraulically applied fiber matrix Formulation | | |
|---|---|---|
| Component | Amount | Amount % |
| Tackifier | | |
| Sodium Alginate | 0.540 g | 18% |
| Xanthan Gum | 0.135 g | 4.5% |
| Corn Starch PC 1110 | 2.055 g | 68.5% |
| Calcium Carbonate ($CaCO_3$) | 0.270 g | 9% |
| Total Tackifier | 3.0 g | 100% |
| Mulch - Wood/Paper Blend | 27 g | |
| Hydraulically Applied Fiber Matrix Formulation | 30 g | |

Example 13

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.750 g | 25% |
| Potato Starch PC 6390 | 1.200 g | 40% |
| Corn Starch PC 1110 | 0.675 g | 22.5% |
| Dibasic Calcium Phosphate | 0.375 g | 12.5% |
| Total Tackifier | 3.0 g | 100% |
| Mulch - Wood/Paper Blend | 27 g | |
| Hydraulically applied fiber matrix Formulation | 30 g | |

Example 14

A Hydraulically Applied Fiber Matrix Formulation was prepared, dispersed, and coated as in Example 1 but containing the following materials:

| Hydraulically applied fiber matrix Formulation | | |
|---|---|---|
| Component | Amount | Amount % |
| Tackifier | | |
| Sodium Alginate | 0.750 g | 25% |
| Corn Starch PC 1110 | 1.50 g | 50% |
| Calcium Citrate | 0.750 g | 25% |
| Total Tackifier | 3.0 g | 100% |
| Mulch - Wood/Paper Blend | 27 g | |
| Hydraulically Applied Fiber Matrix Formulation | 30 g | |

Example 15

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.570 g | 19% |
| Corn Starch PC 1110 | 1.995 | 66.5% |
| Xanthan Gum | 0.135 | 4.5% |
| Calcium Carbonate (CaCO$_3$) | 0.300 | 10% |
| Total Tackifier | 3.0 g | 100% |
| Mulch - Wood/Paper Blend | 27 g | |
| Hydraulically Applied Fiber Matrix Formulation | 30 g | |

Example 16

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.600 g | 20% |
| Potato Starch PC 6390 | 0.450 g | 15% |
| Corn Starch PC 1110 | 1.350 g | 45% |
| Calcium Citrate | 0.600 g | 20% |
| Total Tackifier | 3.0 g | 100% |
| Mulch - Wood/Paper Blend | 27 g | |
| Hydraulically Applied Fiber Matrix Formulation | 30 g | |

Example 17

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Kappa Carrageenan | 2.25 g | 75% |
| Calcium Citrate | 0.75 g | 25% |
| Total Tackifier | 3.0 g | 100% |
| Mulch - Wood/Paper Blend | 27 g | |
| Hydraulically Applied Fiber Matrix Formulation | 30 g | |

Example 18

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.75 g | 25% |
| Potato Starch PC 6390 | 1.20 g | 40% |
| Corn Starch PC 1110 | 0.675 g | 22.5% |
| Gypsum (calcium sulfate) | 0.375 g | 12.5% |
| Total Tackifier | 3.0 g | 100% |
| Mulch - Wood Fiber | 27 g | |
| Hydraulically Applied Fiber Matrix Formulation | 30 g | |

Example 19

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Iota Carrageenan | 0.75 g | 25% |
| Potato Starch PC 6390 | 1.20 g | 40% |
| Corn Starch PC 1110 | 0.675 g | 22.5% |
| Calcium Citrate | 0.375 g | 12.5% |
| Total Tackifier | 3.0 g | 100% |
| Mulch - Wood Fiber | 27 g | |
| Hydraulically Applied Fiber Matrix Formulation | 30 g | |

Example 20

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Gellan | 0.75 g | 25% |
| Potato Starch PC 6390 | 1.20 g | 40% |
| Corn Starch PC 1110 | 0.675 g | 22.5% |
| Potassium Carbonate | 0.375 g | 12.5% |
| Total Tackifier | 3.0 g | 100% |
| Mulch - Wood Fiber | 27 g | |
| Hydraulically Applied Fiber Matrix Formulation | 30 g | |

Example 21

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Gellan | 0.75 g | 25% |
| Potato Starch PC 6390 | 1.20 g | 40% |
| Corn Starch PC 1110 | 0.675 g | 22.5% |
| Magnesium Oxide | 0.375 g | 12.5% |
| Total Tackifier | 3.0 g | 100% |
| Mulch - Wood Fiber | 27 g | |
| Hydraulically Applied Fiber Matrix Formulation | 30 g | |

Example 22

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar | 2.49 g | 83% |
| Dimethylolurea | 0.3 g | 10% |
| Ammonium Sulfate | 0.21 g | 7% |
| Total Tackifier | 3.0 g | 100% |
| Mulch - Cellulosic/Fiber | 27 g | |
| Hydraulically Applied Fiber Matrix Formulation | 30 g | |

Example 23

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 2.49 g | 83% |
| Dimethylolurea | 0.3 g | 10% |
| Ammonium Sulfate | 0.21 g | 7% |
| Total Tackifier | 3.0 g | 100% |
| Mulch - Cellulosic/Fiber | 27 g | |
| Hydraulically Applied Fiber Matrix Formulation | 30 g | |

Example 24

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar | 1.25 g | 41.5% |
| Sodium Alginate | 1.25 g | 41.5% |
| Dimethylolurea | 0.3 g | 10% |
| Ammonium Sulfate | 0.21 g | 7% |
| Total Tackifier | 3.01 g | 100% |
| Mulch - Cellulosic/Fiber | 27 g | |
| Hydraulically Applied Fiber Matrix Formulation | 30.1 g | |

Example 25

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 2.0 g | 66.67% |
| Calcium Citrate | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 26

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Guar | 2.0 g | 66.67% |
| Calcium Citrate | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 27

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.0 g | 33.33% |
| Calcium Citrate | 0.5 g | 16.67% |
| Guar | 1.245 g | 41.5% |
| Dimethylolurea | 0.15 g | 5% |
| Ammonium Sulfate | 0.105 g | 3.5% |
| Total Tackifier | 3 g | 100% |
| Mulch - Cellulosic/Fiber | 27 g | |
| Hydraulically Applied Fiber Matrix Formulation | 30 g | |

Example 28

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium alginate | 2.0 g | 66.67% |
| Gypsum (calcium sulfate) | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 29

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium alginate | 2.0 g | 66.67% |
| Ground Gypsum (calcium sulfate) | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 30

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Ground sodium alginate | 2.0 g | 66.67% |
| Gypsum (calcium sulfate) | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 31

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Ground sodium alginate | 2.0 g | 66.67% |
| Ground Gypsum (calcium sulfate) | 1.0 g | 33.33% |
| Total Tackifier | 3 g | 100% |
| Mulch - Cellulosic/Fiber | 27 g | |
| Hydraulically Applied Fiber Matrix Formulation | 30 g | |

Example 32

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Hydroxypropyl cellulose | 3.0 g | 100% |
| Total Tackifier | 3 g | 100% |
| Mulch - Cellulosic/Fiber | 27 g | |
| Hydraulically Applied Fiber Matrix Formulation | 30 g | |

Example 33

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.05 g | 35% |
| Potato Starch PC 6390 | 1.20 g | 40% |
| Corn Starch PC 1110 | 0.45 g | 15% |
| Gypsum (calcium sulfate) | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Example 34

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 0.90 g | 30% |
| Potato Starch PC 6390 | 1.20 g | 40% |
| Corn Starch PC 1110 | 0.60 g | 20% |
| Calcium Citrate | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Example 35

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.35 g | 45% |
| Guar | 1.35 g | 45% |
| Gypsum (calcium sulfate) | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Example 36

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.35 g | 45% |
| Hydroxypropyl methyl cellulose | 1.35 g | 45% |
| Gypsum (calcium sulfate) | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Example 37

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Sodium Alginate | 1.35 g | 45% |
| Kappa Carrageenan | 1.35 g | 45% |
| Gypsum (calcium sulfate) | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Example 38

A hydraulically applied fiber matrix formulation was prepared, dispersed, and coated as in Example 1 but containing the following materials:

| Hydraulically Applied Fiber Matrix Formulation | | |
|---|---|---|
| Component | Amount | Amount % |
| Tackifier | | |
| Hydroxypropyl methyl cellulose | 2.70 g | 90% |
| Gypsum (calcium sulfate) | 0.30 g | 10% |
| Total Tackifier | 3.0 g | 100% |
| Mulch - Cellulosic/Fiber | 27 g | |
| Hydraulically Applied Fiber Matrix Formulation | 30 g | |

Testing of Samples

All samples were evaluated using a "rapid rain test." Samples were sprayed with water using a garden hose equipped with a flow plant showerhead. Each sample was sprayed for 5 seconds on each pass. Each sample was evaluated to determine if the mulch disintegrated and washed off the board or if it remained intact without disintegrating.

The results, shown below, demonstrate that hydraulically applied fiber matrix samples 1-3, 5-7, and 12-16, 18, 27-31, and 33-37 containing alginate as part of the tackifier formulation formed highly crosslinked adherent films. Samples 8-11, 17, 19-22, 24, 26, 32, and 38 containing gums such as guar gum, xanthan gum, carrageenan, hydroxypropyl methyl cellulose, or gellan, alone failed to form adherent films. Xanthan gum and guar gum are useful hydrocolloids when used with the water-soluble, crosslinkable, hydratable gums such as alginates.

The results of the "rapid rain test" for several of the samples are also shown below.

| Example | Sample | Result |
|---|---|---|
| 1 | 13 | Crosslinking occurred - Excellent performance |
| 2 | 14 | Crosslinking occurred - Excellent performance |
| 3 | 15 | Crosslinking occurred - Excellent performance |
| 4 | 9 | No crosslinking - Poor performance |
| 5 | 10 | Crosslinking occurred - Excellent performance |
| 6 | 11 | Crosslinking occurred - Excellent performance |
| 7 | 12 | Crosslinking occurred - Excellent performance |
| 8 | 17 | No crosslinking - No performance |
| 9 | 16 | No crosslinking - No performance |
| 10 | 8 | No crosslinking - No performance |
| 11 | 7 | No crosslinking - No performance |
| 12 | — | Crosslinking occurred - Excellent performance |
| 13 | — | Crosslinking occurred - Excellent performance |
| 14 | — | Crosslinking occurred - Excellent performance |
| 15 | — | Crosslinking occurred - Excellent performance |
| 16 | — | Crosslinking occurred - Excellent performance |
| 17 | — | No crosslinking - No performance |
| 18 | — | Crosslinking occurred - Excellent performance |
| 19 | — | No crosslinking - No performance |
| 20 | — | No crosslinking - No performance |
| 21 | — | No crosslinking - Poor performance |
| 22 | — | No crosslinking - No performance |
| 23 | — | No crosslinking - Poor performance |
| 24 | — | No crosslinking - Poor performance |
| 25 | — | Crosslinking occurred - Excellent performance |
| 26 | — | No crosslinking - No performance |
| 27 | — | Crosslinking occurred - Good performance |
| 28 | — | Crosslinking occurred - Excellent performance |
| 29 | — | Crosslinking occurred - Excellent performance |
| 30 | — | Crosslinking occurred - Excellent performance |
| 31 | — | Crosslinking occurred - Excellent performance |
| 32 | — | No crosslinking - No performance |
| 33 | — | Crosslinking occurred - Excellent performance |
| 34 | — | Crosslinking occurred - Excellent performance |
| 35 | — | Crosslinking occurred - Excellent performance |
| 36 | — | Crosslinking occurred - Excellent performance |
| 37 | — | Crosslinking occurred - Good performance |
| 38 | — | No crosslinking - No performance |

The invention has been described in detail with particular reference to certain specific embodiments thereof, but it will be understood that variations and modifications can be effected within the spirit and scope of the invention.

What is claimed is:

1. A hydraulically applicable fiber matrix soil stabilization composition comprising;
    a tackifier composition comprising
        a water-soluble, crosslinkable, hydratable gum comprising an alginate; and
        a gel-forming ion capable of crosslinking the water-soluble, crosslinkable, hydratable gum; and
    a mulch having a mass of about 9 to about 45 times a mass of the gum.

2. The soil stabilization composition of claim 1 wherein the alginate comprises at least one of sodium alginate, ammonium alginate, potassium alginate, and propylene glycol alginate.

3. The soil stabilization composition of claim 1, wherein the alginate comprises sodium alginate, in about 5-60 wt % of the tackifier composition.

4. The soil stabilization composition of claim 1 that comprises less than about 20 wt % moisture in the tackifier composition.

5. The soil stabilization composition of claim 1, wherein the gel-forming ion comprises at least one of magnesium ($Mg^{2+}$), calcium ($Ca^{2+}$), strontium ($Sr^{2+}$), barium ($Ba^{2+}$), aluminum ($Al^{3+}$), boron ($B^{3+}$), lead ($Pb^{4+}$ or $Pb^{2+}$), copper ($Cu^+$ or $Cu^{2+}$,), cadmium ($Cd^{2+}$), zinc ($Zn^{2+}$), nickel ($Ni^{2+}$), manganese ($Mn^{4+}$ or $Mn^{2+}$), iron ($Fe^{2+}$ or $Fe^{3+}$), dichromate ($Cr_2O_7^{2-}$), $^+H_3N(-CH_2)_n-NH_3^+$, and $^+H_3N(-CH_2)_n-CH((CH_2-)_m-NH_3^+)((CH_2)_p-NH_3^+)$, where n is an integer ranging from 1 to 8, and m and p are integers ranging from 0 to 8.

6. The soil stabilization composition of claim 1, where the gel-forming ion comprises calcium ($Ca^{2+}$).

7. The soil stabilization composition of claim 1, wherein the gel-forming ion comprises calcium ($Ca^{2+}$), in the form of calcium citrate or calcium sulfate, in a weight ratio of about 0.05:1 to about 1.5:1, relative to the water-soluble, crosslinkable, hydratable gum.

8. The soil stabilization composition of claim 1, further comprising a hydrocolloid comprising at least one of a starch, acacia gum, agar, carrageenan, cassia gum, or cellulose gum, furcellaran, gellan gum, guar gum, gum ghatti, karaya gum, larch gum, locust bean gum, pectin, plantago, tara gum, tragacanth, xanthan gum, and konjac mannan gum.

9. The soil stabilization composition of claim 8, wherein the starch comprises a gelatinized starch, a modified starch ether, a modified starch ester, or combinations thereof.

10. The soil stabilization composition of claim 9, wherein the gelatinized starch comprises at least one of arracacha starch, arrowroot starch, banana starch, barley starch, breadfruit starch, buckwheat starch, canna starch, cassaya starch, colacasia starch, corn starch, katakuri starch, kudzu starch, malanga starch, millet starch, oat starch, oca starch, pea starch, polynesian arrowroot starch, potato starch, rice starch, rye starch, sago starch, sorghum starch, sweet potato starch, taro starch, water chestnut starch, wheat starch, and yam starch.

11. The soil stabilization composition of claim 9, wherein the gelatinized starch, modified starch ether, or modified starch ester comprises at least one of corn, wheat, tapioca, and potato starch.

12. The soil stabilization composition of claim 9, wherein the starch is gelatinized starch, modified starch ether, a modified starch ester, or combinations thereof and is present from about 1 to about 30 wt % of the soil stabilization composition.

13. The soil stabilization composition of claim 8, wherein the starch comprises a starch that has been carboxymethylated, crosslinked, hydroxypropylated, acetylated, phosphated, sulfated, grafted, methylated, or a combination thereof.

14. The soil stabilization composition of claim 8, wherein the hydrocolloid is present in an amount of from about 1 to about 30 wt % of the soil stabilization composition.

15. The soil stabilization composition of claim 1, further comprising a hydrocolloid comprising at least one of a protein, cellulosic material, a synthetic polymer, a mineral, polyacrylamide, polyacrylate, polyvinyl alcohol, polyethylene oxide, montmorillonite bentonites (smectites), attapulgite, illite, chlorite, kaolinite, serpentine, and laponite.

16. The soil stabilization composition of claim 1, further comprising a hydrocolloid comprising at least one of carboxymethyl cellulose, hydroxypropyl cellulose, hydroxypropyl methylcellulose, collagen, egg whites, furcellaran, and gelatin.

17. The soil stabilization composition of claim 1, further comprising at least one of shredded fiber, seed, ground-up corn stalk, ground-up plant material, paper, cellulose, surfactant, plant nutrient, fertilizer, herbicide, pesticide, sequestering agent, natural fiber, synthetic fiber, and a dye.

18. The soil stabilization composition of claim 1, further comprising a liquid carrier.

19. A method of erosion control comprising applying the soil stabilization composition of claim 1 to a ground surface.

20. The soil stabilization composition of claim 1, wherein the mulch is about 90-99 wt % of the soil stabilization composition.

21. A hydraulically applicable fiber matrix soil stabilization composition comprising;
(a) about 0-10 wt % of a hydrocolloid comprising a starch;
(b) about 1-10 wt % of a water-soluble crosslinkable hydratable gum comprising an alginate;
(c) about 90-99 wt % of a mulch; and
(d) about 0.01-10 wt % of a compound comprising a gel-forming ion capable of crosslinking the water-soluble, crosslinkable, hydratable gum.

22. A method of erosion control comprising:
providing or obtaining a ground surface comprising a coating of a mulch;
applying a tackifier composition to the ground surface to form a coating on the ground surface comprising a soil stabilization composition comprising the tackifier composition and the mulch, the tackifier composition comprising
a water-soluble, crosslinkable, hydratable gum comprising an alginate, and
a gel-forming ion capable of crosslinking the water-soluble, crosslinkable, hydratable gum; and
wherein the mulch has a mass of about 9 to about 45 times a mass of the gum.

* * * * *

UNITED STATES PATENT AND TRADEMARK OFFICE
CERTIFICATE OF CORRECTION

PATENT NO. : 8,808,442 B2  
APPLICATION NO. : 12/942804  
DATED : August 19, 2014  
INVENTOR(S) : Bernu et al.

Page 1 of 1

It is certified that error appears in the above-identified patent and that said Letters Patent is hereby corrected as shown below:

In the Claims

In column 30, line 35, in Claim 1, delete "comprising;" and insert --comprising:--, therefor In column 31, line 17, in Claim 10, delete "cassaya" and insert --cassava--, therefor In column 32, line 20, in Claim 21, delete "comprising;" and insert --comprising:--, therefor Signed and Sealed this
Twenty-third Day of December, 2014

Michelle K. Lee
*Deputy Director of the United States Patent and Trademark Office*